(12) United States Patent
Wilkinson, III

(10) Patent No.: US 10,890,672 B2
(45) Date of Patent: Jan. 12, 2021

(54) INTEGRATED PMT AND CRYSTAL FOR HIGH TEMPERATURE SCINTILLATORS

(71) Applicant: Alpha Spectra, Inc., Grand Junction, CO (US)

(72) Inventor: Frank J. Wilkinson, III, Grand Junction, CO (US)

(73) Assignee: Alpha Spectra, Inc., Grand Junction, CO (US)

( * ) Notice: Subject to any disclaimer, the term of this patent is extended or adjusted under 35 U.S.C. 154(b) by 123 days.

(21) Appl. No.: 15/971,465

(22) Filed: May 4, 2018

(65) Prior Publication Data

US 2019/0339400 A1  Nov. 7, 2019

(51) Int. Cl.
*G01T 1/208* (2006.01)
*H01J 43/04* (2006.01)
*G01T 1/20* (2006.01)

(52) U.S. Cl.
CPC .......... *G01T 1/208* (2013.01); *G01T 1/2002* (2013.01); *G01T 1/2018* (2013.01); *H01J 43/04* (2013.01)

(58) Field of Classification Search
None
See application file for complete search history.

(56) References Cited

U.S. PATENT DOCUMENTS

| | | | |
|---|---|---|---|
| 2009/0140153 A1* | 6/2009 | Flamanc | G01T 1/2018 250/368 |
| 2010/0072398 A1 | 3/2010 | Fruehauf | |
| 2010/0090111 A1* | 4/2010 | Stoller | G01T 1/20 250/337 |

* cited by examiner

*Primary Examiner* — Edwin C Gunberg
(74) *Attorney, Agent, or Firm* — Jason H. Vick; Sheridan Ross, PC

(57) ABSTRACT

A scintillation apparatus design is provided which eliminates the requirement of an optical window between the scintillator and the photosensitive device. The disclosed design provides significantly improved performance with a scintillator mounted directly to the photosensitive device. Improved light coupling between the scintillator and the photosensitive device is achieved. The present disclosure improves the light transmission to the photosensitive device (PSD) by direct coupling of the photosensitive device to the scintillator. By eliminating the need for an optical window, light loss due to the glass interface caused by the optical window likewise may be eliminated. The improvement of light transmission to the PSD improves the gamma ray energy resolution. The quality of the gamma spectroscopy is improved with this design. Furthermore, providing the means and method for evacuating the internal assembly significantly improves the reliability and lifespan of the detector assembly.

24 Claims, 4 Drawing Sheets

INTEGRATED PMT AND CRYSTAL FOR HIGH TEMPERATURE SCINTILLATORS

FIELD OF THE DISCLOSURE

The present disclosure is generally directed to the detection of ionizing radiation with scintillation detectors and more particularly to the design of a specific application for a scintillation detector with an improved design that provides better energy resolution by enhanced light coupling.

BACKGROUND

Scintillation detectors are used for detecting and measuring gamma radiation. The key component to the device is a synthetically grown crystal that can convert gamma radiation into useable visible light. These crystalline detectors have the ability to determine the energy of the gamma ray that is incident onto the scintillator. In this mode the detector is used to provide gamma spectroscopy. Among other uses, scintillation detectors have been used in the oil industry, health physics radiation surveys, environmental monitoring for radioactive contamination, nuclear plant safety, home land security, drug interdiction and medical imaging. For example, a scintillation detector may be used to measure radiation in a bore-hole during oil and gas exploration drilling. Some examples of scintillator detector materials include, but are not limited to, crystals comprising sodium iodide, cesium iodide, and lithium iodide.

Light from a scintillator material is detected by a photosensitive device that converts the light to a useable electrical signal. Scintillation detectors use photosensitive devices such as photomultiplier tubes, photodiodes, and more recently silicone photomultipliers.

Current designs for scintillation detection apparatuses that are used in high temperature and rugged environments require an optical window between the scintillator and the photosensitive device to ensure reliable performance. Due to the requirement of an optical window, light coupling between the scintillator and the photosensitive device is degraded by light that is lost in the glass material and the optical adhesive holding the glass in place. The indirect coupling of the photosensitive device to the scintillator negatively affects the light transmission to the photosensitive device. Measurable light loss occurs because of the glass interface created by the optical window. Furthermore, insufficient light transmission to the photosensitive device caused by the optical window degrades the gamma ray energy resolution, negatively affecting the collection of scintillation events and limiting the quality of the gamma spectroscopy measurement.

SUMMARY

It is with respect to the above issues and other problems that the embodiments presented herein were contemplated. Disclosed herein is a scintillation apparatus design which eliminates the requirement of an optical window. The present disclosure provides increased performance with a scintillator mounted directly to the photosensitive device. Improved light coupling between the scintillator and the photosensitive device is achieved. The present disclosure improves the light transmission to the photosensitive device by direct coupling of the photosensitive device to the scintillator. By eliminating the need for an optical window, light loss due to the glass interface and an unnecessary layer of adhesive couplant may be eliminated. The improvement of light transmission to the photosensitive device improves the gamma ray energy resolution. The quality of the gamma spectroscopy is improved with this design.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_0$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C. § 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The use of the same reference symbols in different drawings indicates similar or identical items.

DETAILED DESCRIPTION

Before any embodiments of the disclosure are explained in detail, it is to be understood that the disclosure is not limited in its application to the details of construction and the arrangement of components or test methods set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
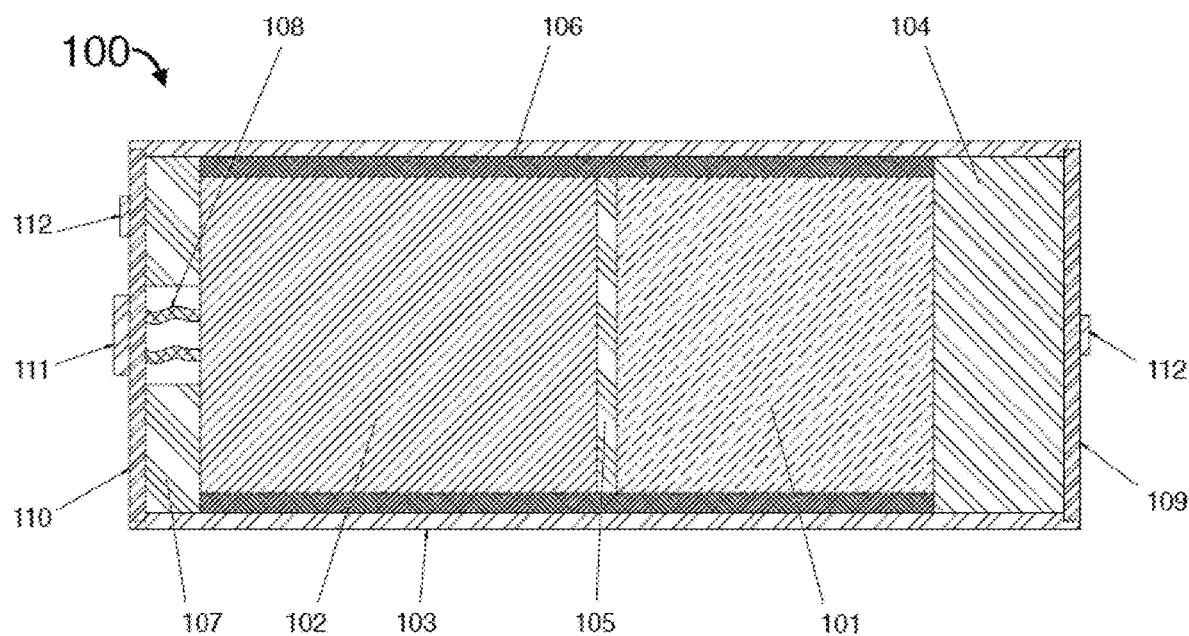
FIG. 1 is a diagram depicting a scintillation detection apparatus in accordance with embodiments of the present disclosure.

As illustrated in FIG. 1, a scintillation detection device 100 may comprise a housing element 103. The housing element 103 may comprise a suitable housing material that can provide a reliable hermetic seal and suitable mechanical integrity and can be sealed by welding or another suitable technique for providing a reliable seal. The scintillation detector 100 may also comprise housing endcaps 109, 110 at each end of the scintillation detector 100. The housing endcaps 109, 110 may also comprise a suitable housing material that can provide a reliable hermetic seal and suitable mechanical integrity and can be sealed by welding or another suitable technique for providing a reliable seal. In some embodiments the housing element 103 may comprise a back endcap 110 and a front endcap 109. The back endcap 110 may be on a side closer to a photosensitive device 102 and further from a scintillation material 101, while the front endcap 109 may be on a side closer to the scintillation material 101 and further from the photosensitive device 102. The back endcap 110 and the front endcap 109 may be metal and welded to the housing element 103. All metal-to-metal joints in the scintillation detector 100 may be vacuum tight welds. In some embodiments, the housing element 103 may be of a stainless steel or titanium material.

The housing element 103 may comprise one or more vacuum pump out ports and/or backfill ports 112 that are capable of being sealed with a weld. While the vacuum pump out ports and/or backfill ports 112 of the scintillation detection device 100 are illustrated in specific positions on the housing element 103, in certain embodiments the vacuum pump out ports and/or backfill ports 112 may be in other positions. In some embodiments, a scintillation detection device may be void of any vacuum pump out ports and/or backfill ports.

Within the housing element 103, a scintillator and/or gamma ray absorbing material 101 may be placed. The housing element 103 may also store a photosensitive device 102. In some embodiments, for example when a photomultiplier (PMT) is used, the PMT in 102 employs a voltage distribution network (not pictured) in order to provide the appropriate voltages to the dynode chain in the photosensitive device. The scintillator may be optically coupled to the photosensitive device 102 with a suitable optical couplant 105 such as a silicone elastomer. The scintillator and/or gamma ray absorbing material may be separated from the photosensitive device 102 by the optical couplant 105. The scintillator and/or gamma ray absorbing material 101, photosensitive device 102 and the optical couplant 105 may be separated from an outer wall of the housing element 103 by one or more thermal or mechanical shock absorbing materials 106, 107. The photosensitive device 102 may be connected to a high temperature connector assembly 111 by wires 108. High temperature vacuum-tight multiple connection connectors that are capable of exceeding 250° C. may be used.

On one end of the interior of the scintillation detector 100, a loading assembly 104 may be placed. A loading assembly 104 may ensure that an optical joint between the scintillator and/or gamma ray absorbing material 101 and the photosensitive device 102 is maintained. The loading assembly 104 also ensures that the gamma absorbing material 101 and the photosensitive device 102 maintain mechanical integrity. The loading assembly 104 may protect the optical joint during periods of extreme temperatures and/or significant mechanical shock and vibration. Shock absorbing material 107 between the back endcap 110 and the photosensitive device 102 may ensure that the photosensitive device 102 and/or the scintillator gamma ray absorbing material 101 are not damaged during severe shock and vibration. In certain embodiments, the scintillation detector 100 may withstand temperatures from −55° C. to +250° C.

In some embodiments, a scintillation detecting device may also comprise a number of other elements. For example, a scintillation detecting device may comprise photosensitive device electronics including voltage divider, preamps and/or signal processing. As additional examples, a scintillation detecting device may also comprise temperature sensors, mechanical shock sensors, and/or vibration sensors. Electrical connections required by such elements may also be provided within the scintillation detecting device as known in the art.

Figure 2:
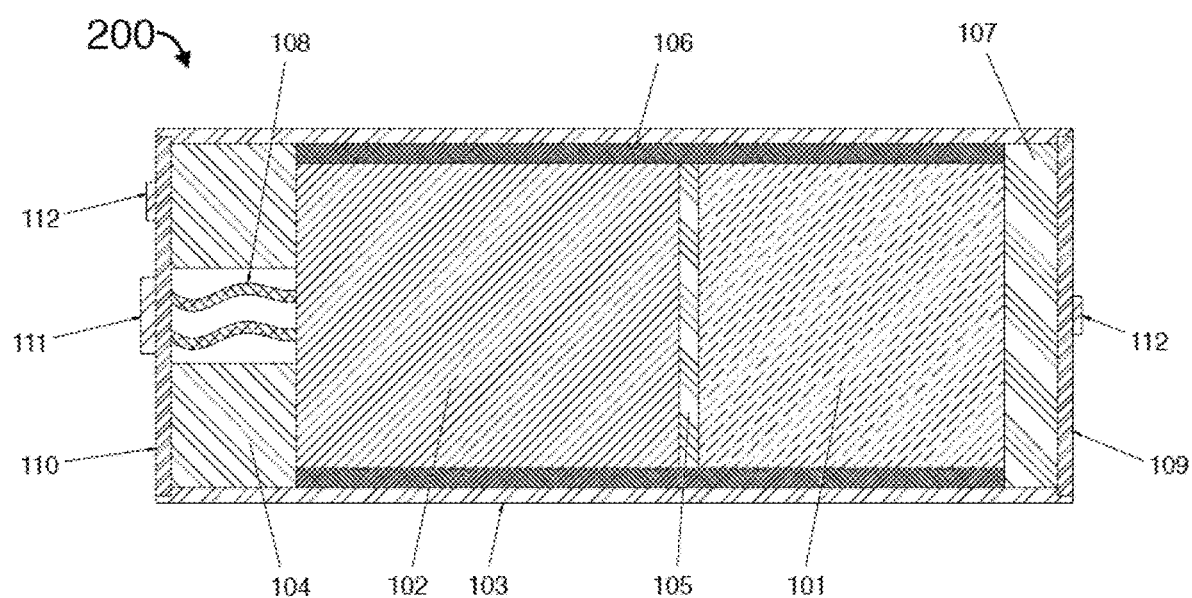
FIG. 2 is a block diagram depicting a scintillation detection apparatus in accordance with embodiments of the present disclosure.

A second exemplary embodiment of a scintillation detection device 200 is illustrated in FIG. 2. While in FIG. 1 the loading assembly 104 is illustrated as being place on the scintillator/gamma ray absorbing material 101 side of the scintillation detecting device 100, as illustrated in FIG. 2, a loading assembly 104 can be configured on the photosensitive device 102 end of the scintillation detecting device 200.

Figure 3:
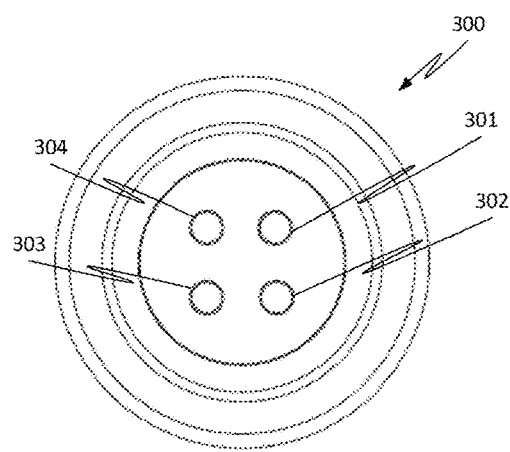
FIG. 3 is a diagram depicting a connector device in accordance with embodiments of the present disclosure
Figure 4:
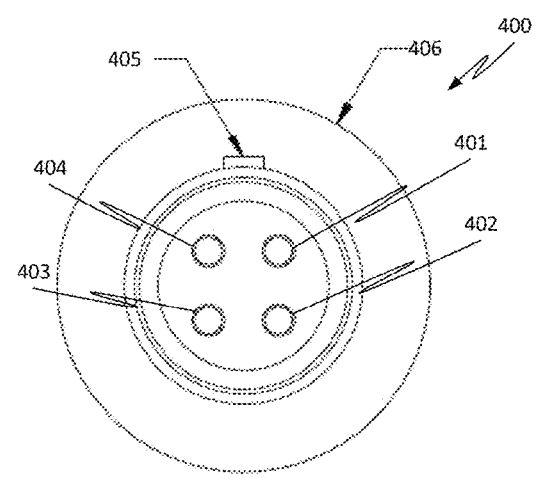
FIG. 4 is a diagram depicting a connector device in accordance with embodiments of the present disclosure
Figure 5:
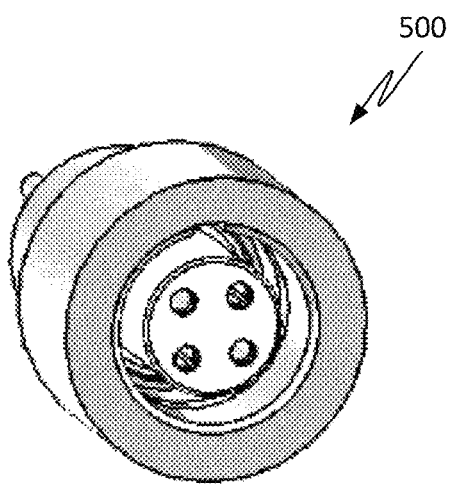
FIG. 5 is a diagram depicting a connector device apparatus in accordance with embodiments of the present disclosure.
Figure 6:
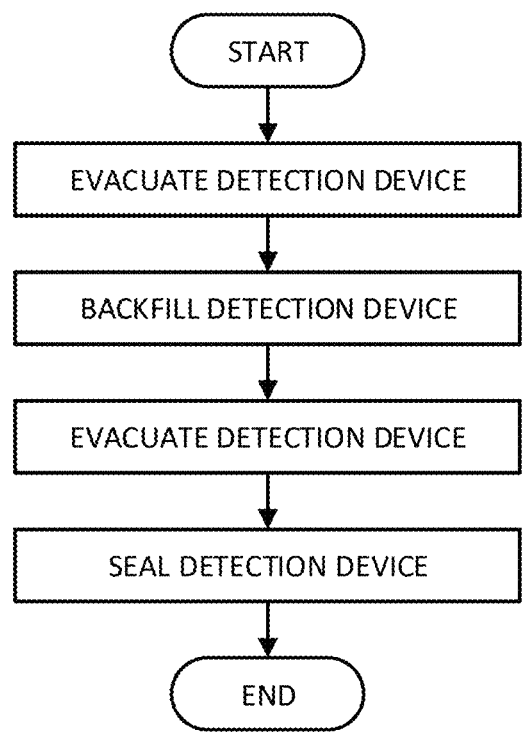
FIG. 6 is a flow chart depicting a method of in accordance with embodiments of the present disclosure.

As discussed above, a photosensitive device may be connected to a high temperature connector assembly by wires. High temperature vacuum-tight multiple connection connectors capable of exceeding 250° C. may be used. In certain embodiments, the connector assembly may comprise a female connector placed on a side of the housing. The connector assembly may be as illustrated in FIGS. 3-5. In some embodiments the connector assembly may comprise one or more pins allowing for the scintillation detection device to connect to and communicate with an external device, such as a computer, and/or connect to a charging module. In some embodiments, the connector assembly may comprise pins including one or more of a ground, a high voltage, a signal, and/or a thermal coupler pin which may be a ground connection common with a first ground connection. In some embodiments, a connector assembly may comprise a key such that the female connector assembly may properly align with and connect to a male connector.

As illustrated in FIG. 3, a connector assembly 300 may comprise four pins 301, 302, 303, 304. In some embodiments, the pins 301, 302, 303, 304 may comprise a ground pin 301, a high voltage pin 302, a signal pin 303, and a thermal coupler pin 304. Turning to FIG. 4, a connector assembly 400 may comprise four pins 401, 402, 403, 404. In some embodiments, the pins 401, 402, 403, 404 may comprise a ground pin 401, a high voltage pin 402, a signal pin 403, and a thermal coupler pin 404. In some embodiments, the connector assembly 400 may also comprise a key 405 proximal to the outer portion 406 of the connector assembly 400. The key 405 may act to align the male connector with the female connector assembly 400 such that the correct pins fit with the male connector. A perspective angled view of a connector assembly as described in conjunction with FIG. 4 is illustrated in FIG. 5.

In order to eliminate the opportunity for the occurrence of any gaps in the adhesive coupling optical couplant between the scintillator and photosensitive device, or, at a minimum, lower the risk of gaps forming between the scintillator and photosensitive device, a method of evacuating, backfilling, and sealing the scintillation detecting device may be used. By evacuating the detecting device in this way, as discussed below, no gaseous pockets can form in the optical coupling between the scintillator and the photosensitive device due to the evacuation method described herein. Evacuation minimizes the potential for creating air pockets in the optical interface adhesive. This eliminates the opportunity for a substantial problem that has caused poor performance in the prior art.

The method may, in some embodiments, begin with the detection device being evacuated to an acceptable leak rate. The acceptable leak rate may be of a certain amount. As an example, a leak rate in some embodiments may not exceed $1.0 \times 10^{-9}$ cc He/sec; however, the leak rate may in other embodiments be limited to other rates or not limited at all.

Next, the device may be backfilled with a dry gas such as nitrogen, helium or argon to displace oxygen.

Finally, the device may be evacuated again and sealed at a high vacuum 1 millitorr at a vacuum pump out port that has a welded seal. In order to eliminate vacuum arcing, proper insulation of metal conducting surfaces may be used. By using such a method to create hermetic and water-tight seals between the optical couplant and the scintillator material and between the optical couplant and the photosensitive device, the requirement for glass housing separating the scintillator material and the photosensitive device may be eliminated.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

What is claimed is:

1. A scintillation detection device comprising:
   a housing comprising a metal material that includes an all-welded assembly to provide a hermetic seal;
   a hygroscopic or non-hygroscopic scintillator material disposed within a cavity of the housing;
   a loading assembly to provide longitudinal loading, wherein the loading assembly is designed to be operated at temperatures up to 250 degrees Celsius;

a photosensitive device disposed within the cavity of the housing;

a voltage distribution network operatively connected to the photosensitive device; and an optical couplant optically coupling the scintillator material with the photosensitive device, wherein the photosensitive device receives light from the scintillator material, wherein the scintillation detection device is under vacuum, and wherein the scintillator material is mounted to the photosensitive device.

2. The scintillation detection device of claim 1, further comprising one or more of a vacuum pump out port and a backfill port.

3. The scintillation detection device of claim 1, wherein the optical couplant comprises silicone elastomer capable of functioning under vacuum.

4. The scintillation detection device of claim 1, wherein the photosensitive device is a photomultiplier tube (PMT) and is connected to a high temperature connector assembly.

5. The scintillation detection device of claim 4, wherein the high temperature connector assembly is capable of exceeding temperatures of 250 degrees Celsius.

6. The scintillation detection device of claim 1, wherein the loading assembly is placed between the scintillation material and a rear endcap of the housing.

7. The scintillation detection device of claim 1, wherein the loading assembly is placed between the photosensitive device and a front endcap of the housing.

8. The scintillation detection device of claim 1, wherein the scintillation detection device comprises one or more metal to metal vacuum tight welded joints.

9. The scintillation detection device of claim 1, wherein the housing further comprises a welded and hermetically sealed female connector assembly.

10. The scintillation detection device of claim 1, wherein the scintillator material is mounted to the photosensitive device via only the optical couplant.

11. The scintillation detection device of claim 1, wherein the scintillator material is directly mounted to the optical couplant, and wherein the optical couplant is directly mounted to the photosensitive device.

12. A method of forming a scintillation detection device, the method comprising:

evacuating a cavity of a scintillation detection device housing, wherein the housing comprises:
  a metal material;
  a scintillator material disposed within the cavity of the housing;
  a photosensitive device disposed within the cavity of the housing, wherein the photosensitive device employs a voltage distribution network; and
  an optical couplant optically coupling the scintillator material with the photosensitive device, wherein the photosensitive device receives light from the scintillator material;

backfilling the cavity of the housing with a dry gas;
evacuating the cavity of the housing; and
sealing the cavity of the housing at a vacuum pump out port while maintaining the scintillation detector device in an internal vacuum, wherein the scintillator material is mounted on the photosensitive device.

13. The method of claim 12, wherein the vacuum pump out port comprises a welded seal.

14. The method of claim 12, wherein the optical couplant comprises silicone elastomer capable of functioning under vacuum.

15. The method of claim 12, wherein the photosensitive device is a photomultiplier tube (PMT) and is connected to a high temperature connector assembly.

16. The method of claim 15, wherein the high temperature connector assembly is capable of exceeding temperatures of 250 degrees Celsius.

17. The method of claim 12, wherein the housing further comprises a loading assembly.

18. The method of claim 17, wherein the loading assembly is placed between the scintillation material and a front endcap of the housing.

19. The method of claim 17, wherein the loading assembly is placed between the photosensitive device and a back endcap of the housing.

20. The method of claim 12, wherein the housing comprises a female connector assembly.

21. The method of claim 12, wherein the scintillation detection device comprises one or more metal to metal vacuum tight welded joints.

22. The method of claim 12, wherein the scintillator material is mounted to the photosensitive device via only the optical couplant.

23. The method of claim 12, wherein the scintillator material is directly mounted to the optical couplant, and wherein the optical couplant is directly mounted to the photosensitive device.

24. The method of claim 12, wherein the scintillation detection device maintains a constant vacuum after the scintillation detection device is sealed.

* * * * *